(12) United States Patent
Bryan

(10) Patent No.: US 6,200,080 B1
(45) Date of Patent: Mar. 13, 2001

(54) SLEEVE FOR A FASTENER FOR AN ELECTRICAL TERMINAL FOR A RAILWAY RAIL

(75) Inventor: Michael Timothy Bryan, Sheffiled (GB)

(73) Assignee: Universal Drilling & Cutting Equipment Limited (GB)

( * ) Notice: Subject to any disclaimer, the term of this patent is extended or adjusted under 35 U.S.C. 154(b) by 0 days.

(21) Appl. No.: 09/458,889

(22) Filed: Dec. 10, 1999

(30) Foreign Application Priority Data

Dec. 12, 1998 (GB) .................................... 9827293

(51) Int. Cl.⁷ .................................................. F16B 13/06
(52) U.S. Cl. ............................. 411/45; 411/55; 411/60.2
(58) Field of Search ................................ 411/24, 25, 26, 411/55, 60.1, 60.2, 271, 44, 45

(56) References Cited

U.S. PATENT DOCUMENTS

| 2,321,170 | * | 6/1943 | Wallace | 411/60.1 |
| 4,289,060 | | 9/1981 | Emmett . | |
| 4,978,264 | * | 12/1990 | Philippe | 411/26 |
| 5,374,145 | * | 12/1994 | Mairesse et al. | 411/60.1 |
| 5,521,951 | * | 5/1996 | Charnley et al. | 411/60.1 |
| 5,803,686 | * | 9/1998 | Erbes et al. | 411/60.1 |

FOREIGN PATENT DOCUMENTS

| 0214139 | 4/1924 | (GB) . |
| 2225401 | 5/1990 | (GB) . |

OTHER PUBLICATIONS

Patents Act 1977 Search Report under Section 17 (a Search Report relating to the corresponding British patent application).

* cited by examiner

Primary Examiner—Neill Wilson
(74) Attorney, Agent, or Firm—Trexler, Bushnell, Giangiorgi, Blackstone & Marr, Ltd.

(57) ABSTRACT

A sleeve (1) to form one component of a fastener, comprises a body portion (2) which is externally cylindrical at (3) and is provided at one end thereof with an enlarged diameter collar (4), the body portion (2) being internally tapered down at (8) from its end (6) remote from the collar (4) as far as the face (7) of the collar (4), and the collar (4) being internally tapered down at (8) from its end (9) remote from the body portion (2) as far as the face (7). The invention also includes, in combination, a sleeve as defined above and a bolt having a frustoconical head, to form a fastener.

7 Claims, 1 Drawing Sheet

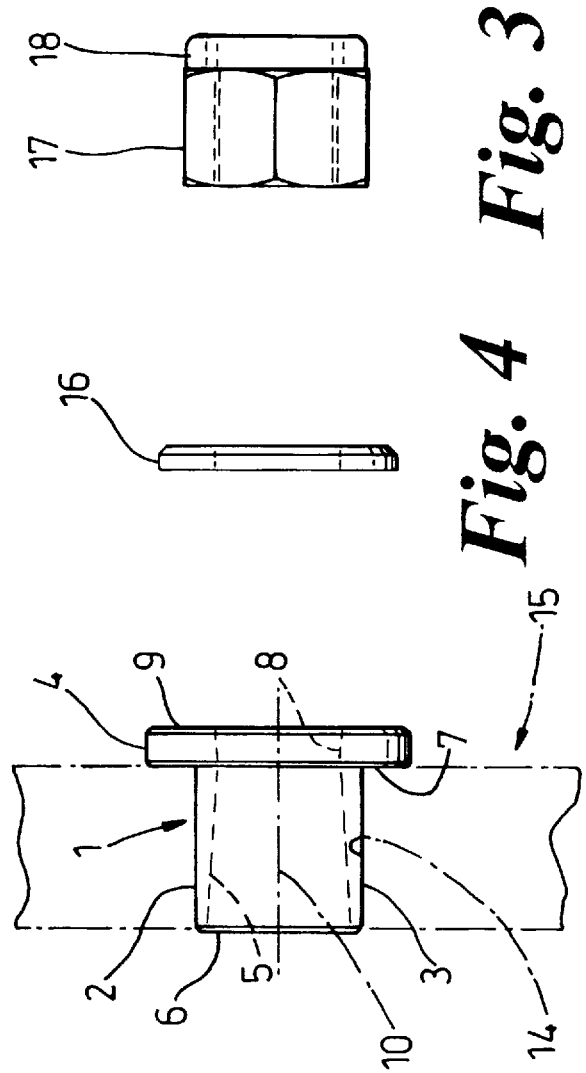

SLEEVE FOR A FASTENER FOR AN ELECTRICAL TERMINAL FOR A RAILWAY RAIL

FIELD OF THE INVENTION

This invention relates to a sleeve to form with a bolt, a fastener for securing an electrical terminal to a railway line for example.

BACKGROUND OF THE INVENTION

Various proposals have been made, U.S. Pat. No. 1,748,532, U.S. Pat. No. 2,248,845, GB 214139, for fasteners for electrical terminals, the fasteners usually comprising a sleeve with a tapered portion which may be split, or non-split, and a terminal collar, for use in conjunction with a bolt having a tapered head to pass into the sleeve when the latter is located in a hole, e.g. in the web of a railway rail, to secure the fastener in the hole.

OBJECT OF THE INVENTION

A basic object of the present invention is the provision of an improved sleeve and a sleeve and bolt combination to constitute a fastener.

SUMMARY OF A FIRST ASPECT OF THE INVENTION

According to a first aspect of the invention, there is provided a sleeve to form one component of a fastener, the sleeve comprising a body portion which is externally cylindrical and is provided at one end thereof with an enlarged diameter collar, the body portion being internally tapered down from its end remote from the collar as far as the collar, and the collar being internally tapered down from its end remote from the body portion as far as the body portion.

The invention thus provides a sleeve with a double taper, the taper within the collar serving to accommodate metal deformed from the collar in the course of securing the sleeve in a hole.

In detail, the sleeve may have an internal taper of 8° or thereabouts, and the collar may also have an internal taper of 8° or thereabouts.

Preferably, the sleeve is of copper, preferably tin coated for enhanced electrical connection.

SUMMARY OF A SECOND ASPECT OF THE INVENTION

According to a second aspect of the invention, of independent significance, there is provided a sleeve in accordance with the first aspect, in combination with a bolt comprising a threaded stem adapted to pass through the sleeve and a tapered head at one end of the stem adapted to engage the internal taper of the body portion of the sleeve.

Preferably, the bolt is of 304 stainless steel.

Preferably, the bolt is tightened by a nut, preferably of BZP steel, preferably with an interposed washer, also preferably of BZP steel. The nut is preferably of the Nylock type, i.e. provided with an integral nylon locking member.

In use, after a hole has been drilled, e.g. in the web of a railway rail, where it is required to insert an electrical connection terminal, the hole diameter approximating of course to the external diameter of the body portion of the sleeve, and the length of the body portion approximating to the thickness of the rail web, the sleeve is manually inserted into the hole until its enlarged diameter collar abuts the side of the web. From the opposite side of the rail web, the stem of the bolt is then inserted through the sleeve to receive the nut, with the washer interposed between the nut and the sleeve collar. Progressive tightening of the nut results in progressive tighter engagement of the taper surfaces of the bolt head and the sleeve, with deformation of the softer material of the sleeve during tightening being accommodated in the annular space provided by the internal taper of the enlarged collar.

The aspects of the invention will now be described in greater detail, by way of example with reference to the accompanying drawings.

BRIEF DESCRIPTION OF THE DRAWINGS

FIG. 1 is a side elevation of a sleeve in accordance with the first aspect;

FIG. 2 is a side elevation of a bolt for use in combination with the sleeve to form a fastener in accordance with the second aspect of the invention;

FIG. 3. a side elevation of a nut to be screwed onto the bolt stem, and

FIG. 4 is a side elevation of an interposed washer.

DETAILED DESCRIPTION OF THE DRAWINGS

In the drawings a sleeve 1 comprises a body portion 2 having a cylindrical external periphery 3 and at one end thereof having an integral, enlarged diameter collar 4. The sleeve 2 has an internal 8° taper 5, being tapered down from its end 6 as far as face 7 of the collar 4. Similarly, the collar 4 has an internal 8° taper 8, being tapered down from its end 9 remote from the body portion 2 as far as its face 7, both tapers being around a common centre line 10. As shown in FIG. 2, a bolt 11 comprises a threaded stem 12 having at one end a tapered head 13.

In use as a fastener, a hole 14 is drilled through a web 15 of a railway rail, the length of the body portion 2 approximating to the thickness of the web 15 and the external periphery 3 of the body portion corresponding to the diameter of the hole 14. When the sleeve 1 is fully inserted into the hole 14, as indicated in FIG. 1, face 7 of the collar 4 abuts the adjacent face of the web 15. From the opposite side of the rail web, the stem 12 is passed through the tapered apertures 5 and 8, so that firstly a washer 16, illustrated in FIG. 4, may be applied to the stem 12, and secondly a nut 17 having a nylon locking element 18 may be applied to the stem 12. Rotation of the nut 17 is continued until the sleeve 1, and specifically its external periphery 3, is in sufficiently tight engagement with the hole 14, with copper of the sleeve 1 deforming due to tightening of the tapered head 13 of the bolt 11 and being at least partially accommodated within the taper 8.

What I claim is:

1. A sleeve to form one component of a fastener, said sleeve comprising a body portion which is externally cylindrical, an enlarged diameter collar provided at one end of said sleeve, said body portion being internally tapered down from an end thereof remote from said collar as far as said collar, and said collar being internally tapered down from an end thereof remote from said body portion as far as said body portion.

2. A sleeve as claimed in claim 1, wherein said body portion has an internal taper of 820 or thereabouts.

3. A sleeve as claimed in claim 1, wherein said enlarged collar has an internal taper of 8° or thereabouts.

4. A sleeve as claimed in claim 1, of copper.

5. A sleeve as claimed in claim 1, having a tin coating.

6. A sleeve to form one component of a fastener, said sleeve comprising a body portion which is externally cylindrical, an enlarged diameter collar provided at one end of said sleeve, said body portion being internally tapered down from an end thereof remote from said collar as far as said collar, and said collar being internally tapered down from an end thereof remote from said body portion as far as said body portion in combination with a bolt comprising a threaded stem adapted to pass through said sleeve and a tapered head at one end of said stem adapted to engage said internal taper of said body portion of said sleeve.

7. A sleeve and bolt combination as claimed in claim 6, wherein said bolt is of stainless steel.

* * * * *